(12) United States Patent  (10) Patent No.: US 11,029,910 B2
Bai  (45) Date of Patent: Jun. 8, 2021

(54) TERMINAL SCREEN AND TERMINAL (71) Applicant: BEIJING XIAOMI MOBILE SOFTWARE CO., LTD., Beijing (CN)

(72) Inventor: Jian Bai, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/740,333

(22) Filed: Jan. 10, 2020

(65) Prior Publication Data
US 2021/0019103 A1  Jan. 21, 2021

(30) Foreign Application Priority Data

Jul. 17, 2019 (CN) .......................... 201910646918.6
Sep. 6, 2019 (CN) .......................... 201921487337.4

(51) Int. Cl.
*G06F 3/14* (2006.01)
*G09G 3/20* (2006.01)

(52) U.S. Cl.
CPC .......... *G06F 3/1423* (2013.01); *G06F 3/1407* (2013.01); *G09G 3/2003* (2013.01); *G09G 2300/0452* (2013.01); *G09G 2340/0407* (2013.01)

(58) Field of Classification Search
None
See application file for complete search history.

(56) References Cited

U.S. PATENT DOCUMENTS

2019/0156729 A1* 5/2019 Zhang ...................... G09G 5/10
2020/0066809 A1  2/2020 Liu
2020/0098332 A1* 3/2020 Zhang ...................... G09G 3/20

FOREIGN PATENT DOCUMENTS

| CN | 208607570 U | 3/2019 |
| EP | 3627483 A1 | 3/2020 |
| WO | 2019062236 A1 | 4/2019 |

OTHER PUBLICATIONS

Extended European search report of counterpart EP application No. 20151801.6 dated Jul. 9, 2020.

* cited by examiner

*Primary Examiner* — Nicholas J Lee
(74) *Attorney, Agent, or Firm* — Syncoda LLC; Feng Ma (57) ABSTRACT

A display screen of a terminal includes a substrate, and a display layer over the substrate. The display layer includes a primary display area and a secondary display area. The secondary display area has a resolution equal to or greater than that of the primary display area. The light transmission performance of the secondary display area is superior to that of the primary display area.

19 Claims, 8 Drawing Sheets

TERMINAL SCREEN AND TERMINAL

CROSS-REFERENCE TO RELATED APPLICATIONS

This application claims priority to Chinese Patent Application No. 201910646918.6 filed on Jul. 17, 2019, and Chinese Patent Application No. 201921487337.4 filed on Sep. 6, 2019, the disclosures of which are hereby incorporated by reference in their entirety.

BACKGROUND

The mobile phone industry has been pursuing a higher screen-to-body ratio, and many users desire mobile phones with screen-to-body ratio of close to 100%.

SUMMARY

The present disclosure relates generally to display screen technologies, and more specifically to a terminal screen and a terminal.

According to a first aspect of the embodiments of the present disclosure, there is provided a terminal screen, including a substrate, and a display layer on the substrate, wherein the display layer includes a primary display area and a secondary display area;

the secondary display area has a resolution equal to that of the primary display area, or the secondary display area has a resolution greater than that of the primary display area; and the light transmission performance of the secondary display area is superior to that of the primary display area.

In some embodiments, the transmittance of the secondary display area is greater than that of the primary display area, and/or the light transmission quality of the secondary display area is superior to that of the primary display area.

In some embodiments, the secondary display area has a pixel size less than that of the primary display area.

In some embodiments, a center-to-center spacing between every two adjacent pixels in the secondary display area is the same as a center-to-center spacing between every two adjacent pixels in the primary display area.

In some embodiments, a pixel arrangement manner of the secondary display area is the same as that of the primary display area.

In some embodiments, a pixel structure of the secondary display area is the same as that of the primary display area.

In some embodiments, at least one pixel is removed from the secondary display area.

In some embodiments, the pixels removed from the secondary display area are uniformly distributed in the secondary display area.

In some embodiments, an area between every two adjacent pixels in the secondary display area is subjected to a light transmission performance optimization process.

In some embodiments, a pixel control circuit of the secondary display area is located below the pixel in the secondary display area.

In some embodiments, a pixel control circuit of the secondary display area is located in the primary display area.

In some embodiments, the display layer further includes a transition display area, the transition display area being located between the primary display area and the secondary display area; and the pixel control circuit of the secondary display area is located in the transition display area and/or the primary display area.

In some embodiments, the pixel control circuit of the secondary display area has a size smaller than that of the pixel control circuit of the primary display area.

In some embodiments, the secondary display area is in a notch portion formed in an edge at the top of the primary display area; and/or the secondary display area is in a notch portion formed in an edge on the left side of the primary display area; and/or the secondary display area is in a notch portion formed in an edge on the right side of the primary display area; and/or the secondary display area is in a notch portion formed in an edge at the bottom of the primary display area; and/or the secondary display area is in a notch portion formed in the middle of the primary display area.

According to a second aspect of the embodiments of the present disclosure, there is provided a terminal, including the terminal screen as described in the first aspect.

According to a third aspect of the embodiments of the present disclosure, there is provided a terminal, including a terminal screen, wherein the terminal screen includes a substrate, and a display layer on the substrate;

the display layer includes a primary display area and a secondary display area;

the secondary display area has a resolution equal to that of the primary display area, or the secondary display area has a resolution greater than that of the primary display area;

the light transmission performance of the secondary display area is superior to that of the primary display area; and optical devices are arranged below the secondary display area.

In some embodiments, the optical devices include at least one of the followings: a camera, a light sensor, a proximity sensor, an optical transmitter, and an optical receiver.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the disclosure as recited in the appended claims.

Increasing the screen-to-body ratio of the mobile phone can involve problems such as how to reasonably arrange functional devices (such as a camera, an earpiece, a light sensor, a distance sensor and a fingerprint sensor) on a front panel of the mobile phone to maximize the screen-to-body ratio. By arranging these functional devices underneath the mobile phone screen, a space occupied by these functional devices on the front panel of the mobile phone may be released sufficiently, such that the screen-to-body ratio is increased.

However, for some optical devices (such as a camera, a light sensor, an infrared transmitter and an infrared receiver) that need to receive or emit light in operation, after these optical devices are arranged underneath the mobile phone screen, the working performances of these optical devices may be affected or even these optical devices fail to work normally due to the light transmission of the mobile phone screen.

Various embodiments of the present disclosure can solve problems in conventional devices such as that, after optical devices are arranged below the terminal screen, the working performances of these optical devices may be affected or even these optical devices fail to work normally due to the light transmission of the terminal screen.

Figure 1:
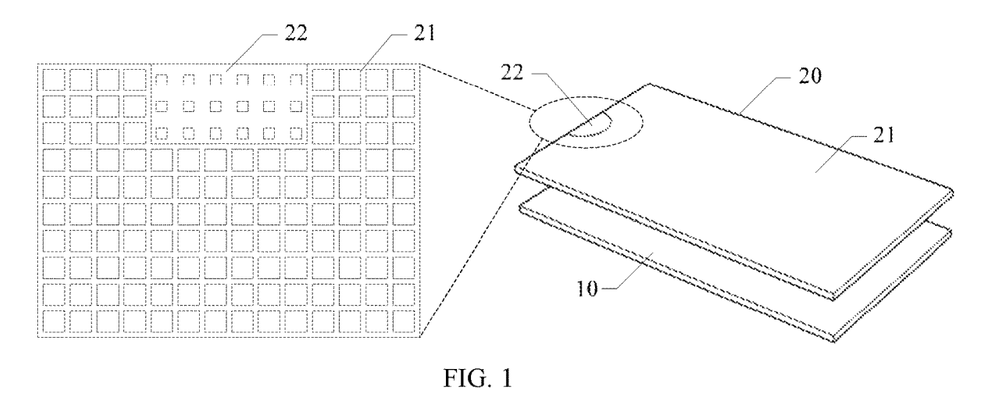
FIG. 1 is a schematic diagram of a terminal screen shown according some embodiments of the present disclosure.

FIG. 1 is a schematic diagram of a terminal screen shown according some embodiments. As shown in FIG. 1, the terminal screen may include a substrate 10, and a display layer 20 located on the substrate 10.

The display layer 20 is used to implement a display function of the terminal screen. In some embodiments of the present disclosure, the display layer 20 includes a primary display area 21 and a secondary display area 22. The primary display area 21 and the secondary display area 22 have a display function, respectively. There may be one or more secondary display areas 22. In FIG. 1, a schematic explanation is given by taking one secondary display area 22 as an example. In some embodiments, the primary display area 21 is a display area having a relatively large area ratio in the display layer 20, and the secondary display area is a display area having a relatively small area ratio in the display layer 20. That is, the area ratio of the primary display area 21 in the display layer 20 is larger than the area ratio of the secondary display area 22 in the display layer 20.

In some embodiments of the present disclosure, the display layer 20 includes two different types of display areas, i.e., a primary display area 21 and a secondary display area 22. However, the primary display area 21 and the secondary display area 22 are of a unified whole body in physical structure. That is, the display layer 20 is of an integrated structure that is not divided into a plurality of mutually independent components. For example, the display layer 20 is arranged on a substrate 10 of an integrated structure. That is, the primary display area 21 and the secondary display area 22 are formed on one substrate. The substrate 10 may be made of a glass material or a flexible material such as PI (polyimide), which will not be limited in the embodiment of the present disclosure.

If the display layer 20 includes a plurality of mutually independent components, and these components are spliced to form the display layer 20, there must be a certain gap at the splicing position, finally resulting in a gap between display contents of the respective components. Therefore, an integral and gap-free display effect of the display contents of the entire display layer 20 cannot be achieved.

In some embodiments of the present disclosure, since the primary display area 21 and the secondary display area 22 are of a unified whole body in physical structure, and free of a gap therebetween, there is also no gap between the display content of the primary display area 21 and the display content of the secondary display area 22. Therefore, an integral and gap-free display effect of the display contents of the entire display layer 20 can be achieved.

In some embodiments of the present disclosure, the secondary display area 22 has a resolution equal to that of the primary display area 21, or has a resolution greater than that of the primary display area 21.

The resolution refers to the number of pixels per unit area. For example, the unit of resolution may be PPI (Pixels Per Inch). For example, the secondary display area 22 and the primary display area 21 have a resolution of 400 PPI, respectively, that is, the resolution of the secondary display area 22 is the same as that of the primary display area 21. For another example, the secondary display area 22 has a resolution of 500 PPI, and the primary display area 21 has a resolution of 400 PPI, that is, the resolution of the secondary display area 22 is greater than that of the primary display area 21. In FIG. 1, a schematic explanation is given with the resolution of the secondary display area 22 being equal to that of the primary display area 21.

In addition, the primary display area 21 and the secondary display area 22 may include a plurality of pixels, respectively. In general cases, one pixel includes sub-pixels of three different colors R (red), G (green), and B (blue). That is, one pixel includes at least one red sub-pixel, at least one green sub-pixel, and at least one blue sub-pixel. Of course, in some other possible embodiments, one pixel may also include only sub-pixels of one color. For example, one pixel includes only sub-pixels of any one of R, G, and B. Alternatively, one pixel may also include only sub-pixels of two colors. For example, one pixel includes only sub-pixels of any two colors of R, G, and B. Alternatively, one pixel further includes at least one sub-pixel of another color, such as at least one white sub-pixel, in addition to at least one red sub-pixel, at least one green sub-pixel, and at least one blue sub-pixel. The color and quantity of the sub-pixels included in one pixel will not be limited in the present disclosure.

In addition, in the embodiment of the present disclosure, the light transmission performance of the secondary display region 22 is superior to that of the primary display region 21. The light transmission performance is an index for measuring the light transmission capacity of a medium (such as the primary display area 21 and the secondary display area 22 in the embodiment of the present disclosure).

In some embodiments, the transmittance of the secondary display area 22 is greater than that of the primary display area 21, and/or the light transmission quality of the secondary display area 22 is superior to that of the primary display area 21. The transmittance is a percentage of the flux of light transmitted through a medium (such as the primary display area 21 and the secondary display area 22 in the embodiment of the present disclosure) to the flux of incident light. The transmittance may also be referred to as a light transmittance. The light transmission quality refers to the quality of light transmitted through a medium (such as the primary display area 21 and the secondary display area 22 in the embodiment of the present disclosure). The characterization parameters of the light transmission quality include, but are not limited to, at least one of the followings: haze, SFR (Spatial Frequency Response), MTF (Modulation Transfer Function), which correspond to a sharpness index of an image. In the embodiment of the present disclosure, an optical device may be arranged below the secondary display area 22. Since the secondary display area 22 has better transmittance and/or light transmission quality, the working performance of the optical device can be best ensured.

In one possible implementation, the secondary display area 22 has a pixel size smaller than that of the primary display area 21. For example, the length of each pixel in the secondary display area 22 is less than that of each pixel in the primary display area 21, and/or the width of each pixel in the secondary display area 22 is less than that of each pixel in the primary display area 21. The side length of each pixel in a lateral direction is referred to as the length of this pixel, and the side length of each pixel in a longitudinal direction is referred to as the width of this pixel. For any pixel, it includes a light-emitting area and a non-light-emitting area. In the embodiment of the present disclosure, the size of a pixel refers to the size of a light-emitting area of this pixel.

In an example, the length of each pixel in the secondary display area 22 is the same as that of each pixel in the primary display area 21, and the width of each pixel in the secondary display area 22 is less than that of each pixel in the primary display area 21. For example, the width of each pixel in the secondary display area 22 may be ½, ⅓, or ¼ of the width of each pixel in the primary display area, which will not be limited in the embodiment of the present disclosure. In another example, the width of each pixel in the secondary display area 22 is the same as that of each pixel in the primary display area 21, and the length of each pixel in the secondary display area 22 is less than that of each pixel in the primary display area 21. For example, the length of each pixel in the secondary display area 22 may be ½, ⅓, or ¼ of the length of each pixel in the primary display area, which will not be limited in the embodiment of the present disclosure. In yet another example, the length of each pixel in the secondary display area 22 is less than that of each pixel in the primary display area 21, and the width of each pixel in the secondary display area 22 is less than that of each pixel in the primary display area 21. For example, the length of each pixel in the secondary display area 22 may be ½, ⅓, or ¼ of the length of each pixel in the primary display area, and the width of each pixel in the secondary display area 22 may be ½, ⅓ or ¼ of the width of each pixel in the primary display area, which will not be limited in the embodiment of the present disclosure.

In addition, as already mentioned above, one pixel generally includes a plurality of sub-pixels. In some embodiments, the size of each of the sub-pixels in the secondary display area 22 is smaller than that of each of the sub-pixels in the primary display area 21. For example, the length of each sub-pixel in the secondary display area 22 is less than that of each sub-pixel in the primary display area 21; and/or the width of each sub-pixel in the secondary display area 22 is less than that of each sub-pixel in the primary display area 21. The side length of each sub-pixel in a lateral direction is referred to as the length of this sub-pixel, and the side length of each sub-pixel in a longitudinal direction is referred to as the width of this sub-pixel. Similarly, the size of a sub-pixel refers to the size of a light-emitting area of this sub-pixel.

Since an area where each pixel is located has relatively poor light transmission performance, but the light transmission performance between pixels is relatively good, by designing the pixel size of the secondary display area 22 to be smaller than that of the primary display area 21, the light transmission performance of the secondary display area 22 can be superior to that of the primary display area 21 when the secondary display area 22 has a resolution equal to that of the primary display area 21, even when the secondary display area 22 has a resolution greater than that of the primary display area 21. In this way, the light transmission performance of the secondary display area 22 is improved while a display effect of the secondary display area 22 is ensured as much as possible.

In addition, the pixel shape of the secondary display area 22 may be the same as or different from the pixel shape of the primary display area 21. For example, the pixel shape of the primary display area 21 is square, e.g., each sub-pixel in the primary display area 21 is in a square shape; the pixel shape of the secondary display area 22 may also be square, e.g., each sub-pixel in the secondary display area 22 is also in a square shape; or the pixel shape of the secondary display area 22 may also be circular, elliptical or other shapes, e.g., each sub-pixel in the secondary display area 22 may also be in a circular shape, an elliptical shape or the like. In addition, the shape or size of each sub-pixel in the primary display area 21 may be the same or different, and the shape or size of each sub-pixel in the secondary display area 22 may be the same or different, which will not be limited in the embodiment of the present disclosure.

In some embodiments, in order to further improve the display effect of the terminal screen, and reduce or eliminate a display difference between the secondary display area 22 and the primary display area 21 as much as possible, a center-to-center spacing between every two adjacent pixels in the secondary display area 22 may be designed to be the same as a center-to-center spacing between every two adjacent pixels in the primary display area 21, or a pixel arrangement manner of the secondary display area 22 may be designed to be the same as that of the primary display area 21, or the pixel structure of the secondary display area 22 may be designed to be the same as that of the primary display area 21, etc. The center-to-center spacing between every two adjacent pixels refers to a distance between center points of two pixels adjacent in position. For example, if the center-to-center spacing between every two adjacent pixels in the primary display area 21 is L, the center-to-center spacing between every two adjacent pixels in the secondary display area 22 is also L. The pixel arrangement manners include Delta arrangement, Pentile arrangement, standard RGB arrangement, and the like. For example, the pixel arrangement manner of the primary display area 21 is the same as that of the secondary display area 22, both of which are Delta arrangement. The pixel structure refers to components of a pixel and a relational relationship of respective components of the pixel. For example, the pixels in the primary display area 21 may be stacked in the same structure as the secondary display area 22.

Of course, in some other examples, the center-to-center spacing between every two adjacent pixels in the secondary display area 22 may also be different from the center-to-center spacing between every two adjacent pixels in the primary display area 21, the pixel arrangement manner of the secondary display area 22 may also be different from that of the primary display area 21, and the pixel structure of the secondary display area 22 may also be different from that of the primary display area 21, which will not be limited in the embodiment of the present disclosure.

In some embodiments, if it is desired to further improve the light transmission performance of the secondary display area 22, at least one pixel may be removed from the secondary display area 22. In some embodiments, the pixels removed from the secondary display area 22 are uniformly distributed in the secondary display area 22 to ensure that the display effects of the respective parts of the secondary display area 22 are as identical or similar as possible, thereby preventing the display effect of a certain area from being significantly worse than that of other areas. Of course, in some other examples, the pixels removed from the secondary display area 22 may be distributed non-uniformly or randomly in the secondary display area 22, which will not be limited in the embodiment of the present disclosure.

In some embodiments, if it is desired to further improve the light transmission performance of the secondary display area 22, it is also possible to perform a light transmission performance optimization process on an area between every two adjacent pixels in the secondary display area 22 to improve the light transmission performance of the area between every two adjacent pixels in the secondary display area 22. The light transmission performance optimization process refers to a process of further improving the transmittance and/or the light transmission quality. For example, a material of the area between every two adjacent pixels in the secondary display area 22 may be appropriately processed to further improve the light transmission performance of this area.

In addition, the secondary display area 22 is provided with a corresponding pixel control circuit for performing display control on pixels in the secondary display area 22, e.g., controlling the pixels in the secondary display area 22 to emit light. The pixel control circuit may include components such as a TFT (Thin Film Transistor) and a capacitor, these components being used to implement functions such as switching control, pixel compensation, and light-emitting driving of the pixels. The pixel control circuit may be connected to the pixels through wiring. In the embodiment of the present disclosure, the wiring refers to a power line and/or a signal line for controlling pixel display. The power line is used to supply a voltage to the pixels. The signal line is used to supply a control signal, such as a pixel value (e.g., brightness or gray scale), to the pixels. The signal line may also be referred to as a data line.

With respect to the secondary display area 22, each sub-pixel may be provided with an independent pixel control circuit, or a plurality of sub-pixels may share one pixel control circuit. If each sub-pixel is provided with an independent pixel control circuit, each sub-pixel may be controlled separately, which is more flexible. If a plurality of sub-pixels shares one pixel control circuit, the number of pixel control circuits of the secondary display area 22 may be reduced to some extent.

In one possible implementation, the pixel control circuit of the secondary display area 22 is located below the pixels in the secondary display area 22. For example, below each sub-pixel in the secondary display area 22, a pixel control circuit corresponding to this sub-pixel is provided. In some embodiments, by miniaturizing the pixel control circuit of the secondary display area 22, the area occupied by the pixel control circuit may be reduced as much as possible. Therefore, the pixel control circuit can be arranged below the sub-pixel, without occupying an area between every two adjacent sub-pixels, thereby ensuring that the secondary display area 22 has relatively high light transmission performance. For example, the number of TFTs included in the pixel control circuit of the secondary display area 22 may be appropriately reduced, and only a necessary circuit for enabling the sub-pixels to normally write information and emit light can be retained. Some structures involving circuit performance optimizations, such as pixel compensation and reset, are omitted, thereby reducing the area occupied by the pixel control circuit. Alternatively, it is also possible to reduce the sizes of components included in the pixel control circuit by a process, thereby further minimizing the entire pixel control circuit.

In another possible implementation, the pixel control circuit of the secondary display area 22 is located in the primary display area 21. For example, the pixel control circuit of the secondary display area 22 may be arranged below a sub-pixel in an area of the primary display area 21 adjacent to the secondary display area 22. Of course, in some other possible embodiments, part of the pixel control circuit of the secondary display area 22 may be located below the pixel in the secondary display area 22 and the remaining part thereof is located in the primary display area 21, which will not be limited in the embodiment of the present disclosure.

Figure 2:
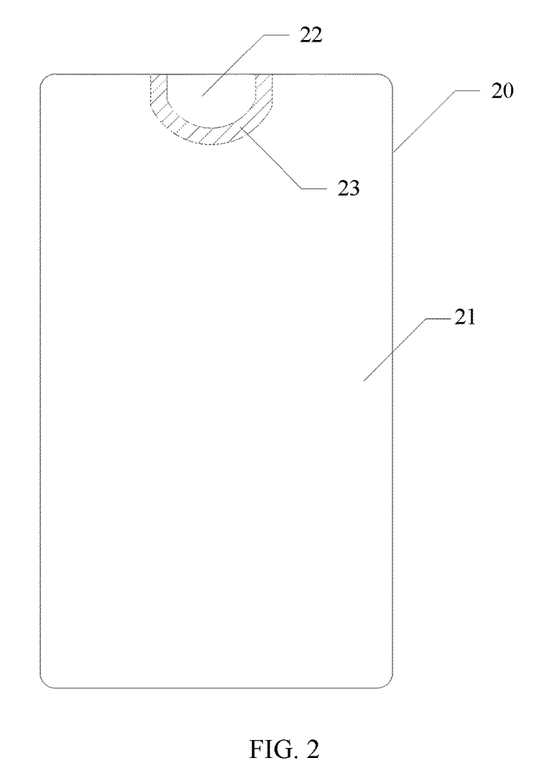
FIG. 2 exemplarily shows a schematic diagram of a transition display area.

In yet another possible implementation, as shown in FIG. 2, the display layer 20 further includes a transition display area 23 (an area filled by oblique lines in FIG. 2), the transition display area 23 being located between the primary display area 21 and the secondary display area 22. The transition display area 23 may have the same resolution as that of the primary display area 21 and the secondary display area 22. Alternatively, when the primary display area 21 has a resolution different from that of the secondary display area 22, for example, when the secondary display area 22 has a resolution greater than that of the primary display area 21, the resolution of the transition display area 23 may be between the resolution of the primary display area 21 and the resolution of the secondary display area 22, thereby achieving a smooth transition of the resolutions and improving the display effect of the entire terminal screen. When the display layer 20 further includes the transition display area 23, the pixel control circuit of the secondary display area 22 may be located in the transition display area 23 and/or in the primary display area 21. The pixel control circuit of the secondary display area 22 may be entirely located in the primary display area 21, or may be entirely located in the transition display area 23, or may be partially located in the primary display area 21 with the remaining part being located in the transition display area 23.

In addition, the size and structure of the pixel control circuit of the secondary display area 22 may be the same as or different from the size and structure of the pixel control circuit of the primary display area 21. In one example, the size of the pixel control circuit of the secondary display area 22 is smaller than that of the pixel control circuit of the primary display area 21. That is, the pixel control circuit of the secondary display area 22 is made smaller than the pixel control circuit of the primary display area 21, so that the pixel control circuit of the secondary display area 22 may be placed below the pixel in the secondary display area 22, without affecting the light transmission performance of the secondary display area 22. In addition, by reducing the size of the pixel control circuit of the secondary display area 22, the number of components included in the pixel control circuit may be reduced. For example, the 7T1C structure is simplified to a 2T1C structure, a 3T1C structure or even a 1T1C structure, or a capacitor may also be omitted, where T represents TFT, and C represents a capacitor. For example, the 7T1C structure represents one TFT and one capacitor, and the 2T1C structure represents two TFTs and one capacitor. Alternatively, the sizes of the components included in the pixel control circuit can be reduced by a process, so that the entire pixel control circuit is further miniaturized.

In addition, the terminal screen provided by the embodiment of the present disclosure may be an OLED (Organic Light-Emitting Diode) screen, or may be a screen of other type, such as an LCD (Liquid Crystal Display) screen. The types of the terminal screen will not be limited in the embodiment of the present disclosure. Taking the OLED screen as an example, the display layer 20 may include a cathode, an electron transport layer, an organic light-emitting layer, a hole transport layer, and an anode which are sequentially stacked from top to bottom. The substrate 10 is located below the display layer 20 to take a bearing effect.

Figure 3:
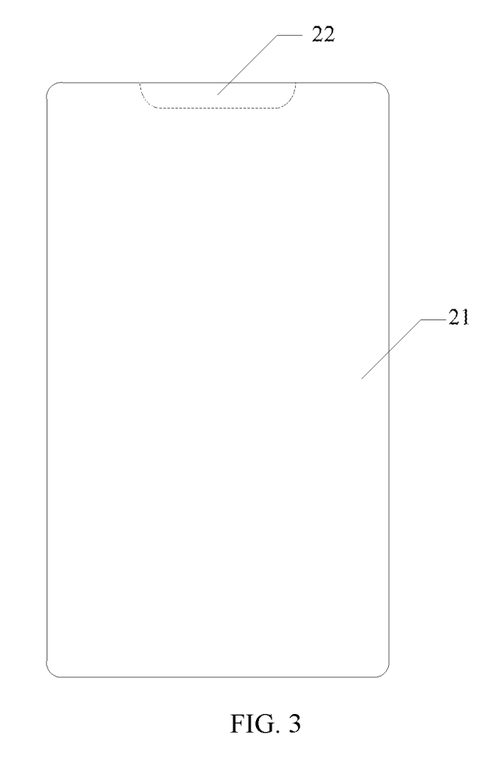
FIG. 3 is a schematic diagram illustrating a first positional relationship of primary display areas and secondary display areas according some embodiments of the present disclosure.
Figure 4:
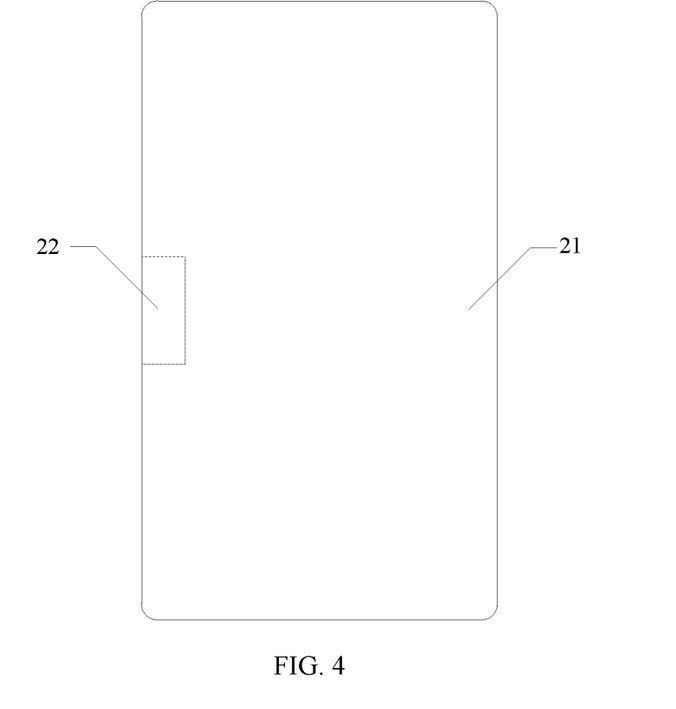
FIG. 4 is a schematic diagram illustrating a second positional relationship of primary display areas and secondary display areas according some embodiments of the present disclosure.
Figure 5:
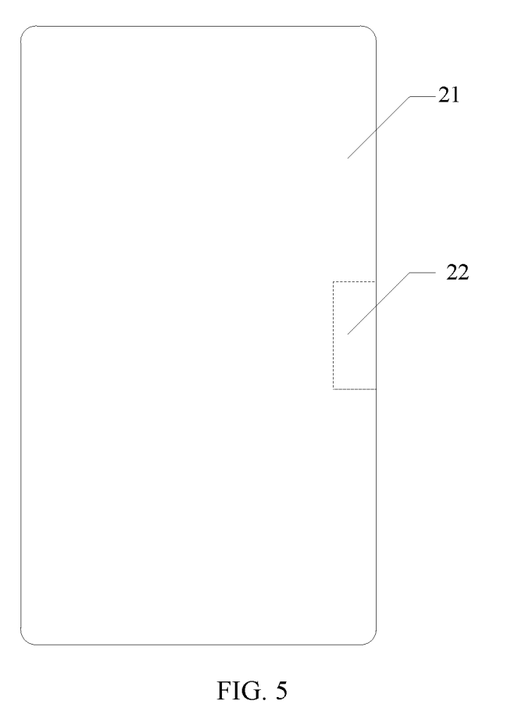
FIG. 5 is a schematic diagram illustrating a third positional relationship of primary display areas and secondary display areas according some embodiments of the present disclosure.
Figure 6:
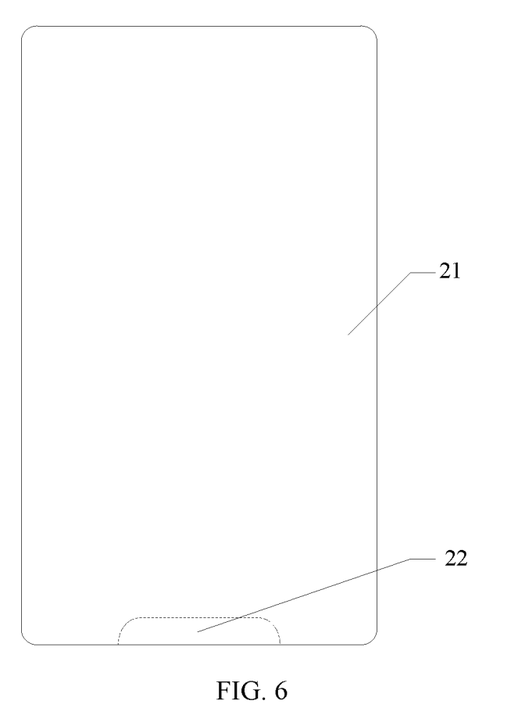
FIG. 6 is a schematic diagram illustrating a fourth positional relationship of primary display areas and secondary display areas according some embodiments of the present disclosure.
Figure 7:
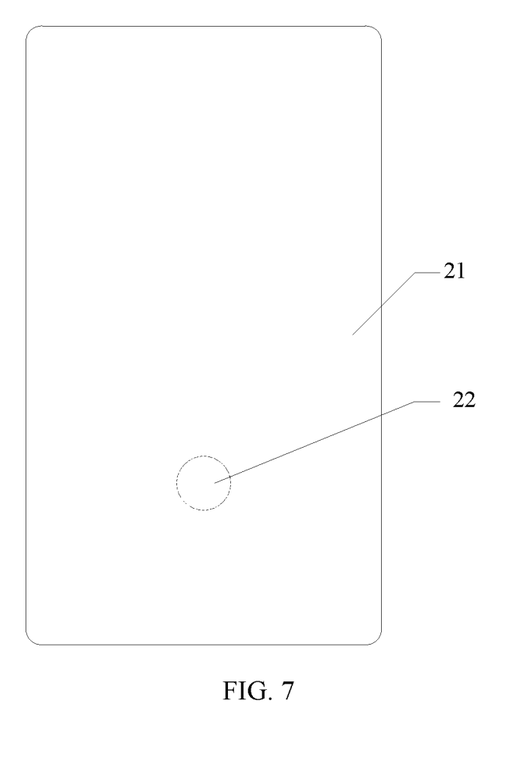
FIG. 7 is a schematic diagram illustrating a fifth positional relationship of primary display areas and secondary display areas according some embodiments of the present disclosure.

It should be noted that, in the embodiment of the present disclosure, the positional relationship between the secondary display area 22 and the primary display area 21 will not be limited. The positional relationship between the secondary display area 22 and the primary display area 21 includes, but is not limited to any of the followings: the secondary display area 22 is located in a notch portion formed in an edge at the top of the primary display area 21 (as shown in FIG. 3); the secondary display area 22 is located in a notch portion formed in an edge on the left side of the primary display area 21 (as shown in FIG. 4); the secondary display area 22 is located in a notch portion formed in an edge on the right side of the primary display area 21 (as shown in FIG. 5); the secondary display area 22 is located in a notch portion formed in an edge at the bottom of the primary display area 21 (as shown in FIG. 6); and the secondary display area 22 is located in a notch portion formed in the middle of the primary display area 21 (as shown in FIG. 7), etc.

In the embodiment of the present disclosure, a cross-sectional shape of the secondary display area 22 is not limited, which may be a regular shape such as a rectangular shape, a rounded rectangle shape or a circular shape, or may be an irregular shape such as a waterdrop shape or an arc shape. In addition, the size of the secondary display area 22 is not limited in the embodiment of the present disclosure, which may be designed according to actual needs (for example, it is desired to arrange functional devices below the secondary display area 22).

Figure 8:
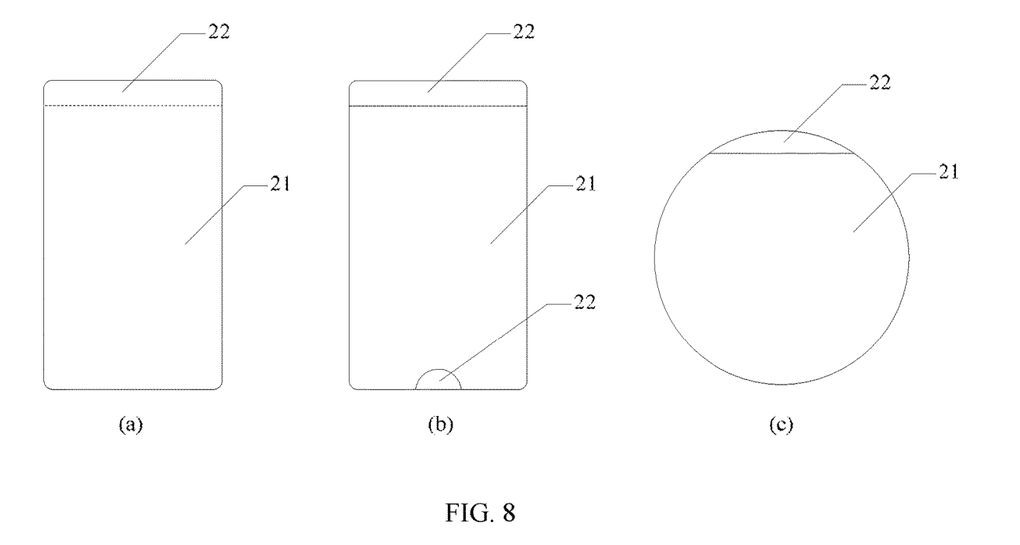
FIG. 8 is a schematic diagram illustrating a sixth positional relationship of primary display areas and secondary display areas according some embodiments of the present disclosure.

In addition, in an example as shown in FIGS. 3 to 7, an exemplary explanation is made by taking a notch portion being formed on the edge or in the middle of the primary display area 21 and the secondary display area 22 being located in the notch portion as an example. In some other possible embodiments, there may be no notch portion being formed on the primary display area 21, and the secondary display area 22 is located beside a side of the primary display area 21 and is closely connected to the primary display area 21. Alternatively, the display layer 20 may also include both a secondary display area 22 in the notch portion formed on the primary display area 21, and a secondary display area 22 located beside a side of the primary display area 21. FIG. 8 exemplarily shows several possible positional relationships between the primary display areas 21 and the secondary display areas 22.

In some embodiments, the terminal screen is in a regular shape which includes any one of the followings: a rectangular shape, a rounded rectangle shape or a circular shape. Of course, in some other possible embodiments, the terminal screen may be in an irregular shape, which will not be limited in the present disclosure.

In summary, in the technical solution provided by the embodiment of the present disclosure, by designing the resolution of the secondary display area to be equal to that of the primary display area, or the resolution of the secondary display area to be greater than that of the primary display area, and designing the light transmission performance of the secondary display area to be superior to that of the primary display area, the light transmission performance of the secondary display area is improved while a display effect of the secondary display area is ensured as much as possible. In this way, optical devices such as a camera, a light sensor, a proximity sensor, an optical transmitter and an optical receiver may be arranged below the secondary display area. In addition, these optical devices can work normally to best ensure the working performances of the optical devices.

In addition, since an area where each pixel is located has relatively poor light transmission performance, but the light transmission performance between pixels is relatively good, by designing the pixel size of the secondary display area to be smaller than that of the primary display area, the light transmission performance of the secondary display area can be superior to that of the primary display area when the secondary display area has a resolution equal to that of the primary display area, even when the secondary display area has a resolution greater than that of the primary display area. In this way, the light transmission performance of the secondary display area can be improved while a display effect of the secondary display area is ensured as much as possible.

In addition, by designing the resolution of the secondary display area to be the same as that of the primary display area, and/or designing a center-to-center spacing between every two adjacent pixels in the secondary display area to be the same as a center-to-center spacing between every two adjacent pixels in the primary display area, and/or designing a pixel arrangement manner of the secondary display area to be the same as that of the primary display area, and/or designing the pixel structure of the secondary display area to be the same as that of the primary display area, a display difference between the secondary display area and the primary display area can be reduced or even eliminated as much as possible, thereby further improving the display effect of the terminal screen.

In addition, by removing at least one pixel from the secondary display area, and/or by performing a light transmission performance optimization process on the area between every two adjacent pixels in the secondary display area, and/or by arranging the pixel control circuit of the secondary display area in the transition display area and/or the primary display area, the light transmission performance of the secondary display area is further improved.

Some embodiments of the present disclosure further provide a terminal. The terminal may be an electronic device such as a mobile phone, a tablet computer, an e-book reader, a multimedia playback device, a wearable device, an in-vehicle terminal, or the like. The terminal includes the terminal screen as provided in the embodiment of FIG. 1 or any of the alternative embodiments as described above.

Figure 9:
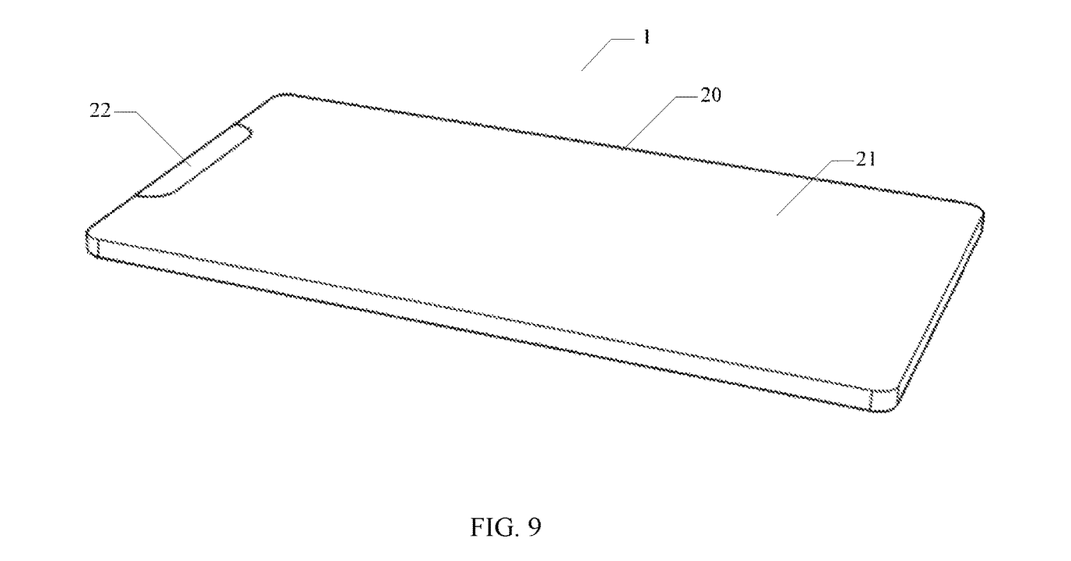
FIG. 9 is a schematic diagram of a terminal shown according some embodiments.

In an example, as shown in FIG. 9, the terminal 1 includes a terminal screen. The terminal screen includes a substrate (not shown in FIG. 9), and a display layer 20 located on the substrate. In some embodiments, a touch sensitive layer and a glass cover may also be included over the display layer 20.

As shown in FIG. 9, the display layer 20 includes a primary display area 21 and a secondary display area 22. In FIG. 9, an introduction is made only by taking a case where the display layer 20 includes a secondary display area 22 which is located in a notch portion formed in an edge at the top of the primary display area 21, and the auxiliary display area 22 and the primary display area 21 jointly form a display layer 20 with a cross-section being in a rounded rectangle shape as example. There may be other positional relationships between the secondary display area 22 and the primary display area 21, which will not be limited in the embodiment of the present disclosure.

In the embodiment of the present disclosure, the secondary display area 22 has a resolution equal to that of the primary display area 21, or has a resolution greater than that of the primary display area 21. In addition, the light transmission performance of the secondary display area 22 is superior to that of the primary display area 21. The related descriptions of the secondary display area 22 and the primary display area 21 may refer to the above embodiments, which will not be repeated in this embodiment.

In addition, according to the terminal provided by the embodiment of the present disclosure, optical devices (not shown in FIG. 9) may be arranged below the secondary display area 22. The optical devices include, but are not limited to, at least one of the followings: a camera, a light sensor, a proximity sensor, an optical transmitter and an optical receiver. The camera is used to implement a shooting function, which may be, for example, a common camera, an infrared camera, a depth camera, or the like. The light sensor is used to acquire the intensity of ambient light. The proximity sensor is used to acquire a distance away from an object in front. The optical transmitter is a functional device used to emit light, which may be, for example, an infrared transmitter or some transmitter that emit other light. An optical receiver is a functional device used to receive light, which may be, for example, an infrared receiver or some receiver used to receive other light.

In some embodiments, the functional devices arranged below the secondary display area 22 may include other functional devices such as an earpiece, a biosensor, an environmental sensor, a food safety detection sensor or a health sensor, in addition to the optical devices as described above. The earpiece is used to implement a sound playback function. The biosensor used to identify biological features of users, which may be, for example, a fingerprint recognition sensor, an iris recognition sensor, or the like. The environmental sensor is used to acquire environmental information, which may be, for example, a temperature sensor, a humidity sensor, an air pressure sensor, or the like. The food safety detection sensor is used to detect indicators of some harmful substances in food, which may be, for example, an optical sensor, a biometric sensor, or the like. The health sensor is used to acquire health information of users, which may be, for example, a sensor for acquiring the user's heart rate, blood pressure, heartbeat or other human body data.

One or more functional devices may be arranged below the secondary display area 22. For example, a camera and a proximity sensor may be arranged below a secondary display area 22. In addition, when the display layer 20 includes a plurality of secondary display areas 22, the functional devices may be or may not be arranged below some secondary display area 22. In addition, the same or different functional devices may be arranged below the two different secondary display areas 22. For example, a camera and a proximity sensor may be arranged below one secondary display area 22, and a fingerprint recognition sensor may be arranged below the other secondary display area 22.

In the embodiment of the present disclosure, by designing the resolution of the secondary display area to be equal to that of the primary display area, or the resolution of the secondary display area to be greater than that of the primary display area, and by designing the light transmission performance of the secondary display area to be superior to that of the primary display area, the light transmission performance of the secondary display area is improved while a display effect of the secondary display area is ensured as much as possible. In this way, optical devices such as a camera, a light sensor, a proximity sensor, an optical transmitter and an optical receiver may be arranged below the secondary display area. In addition, these optical devices can be work normally to best ensure the working performances of the optical devices.

Figure 10:
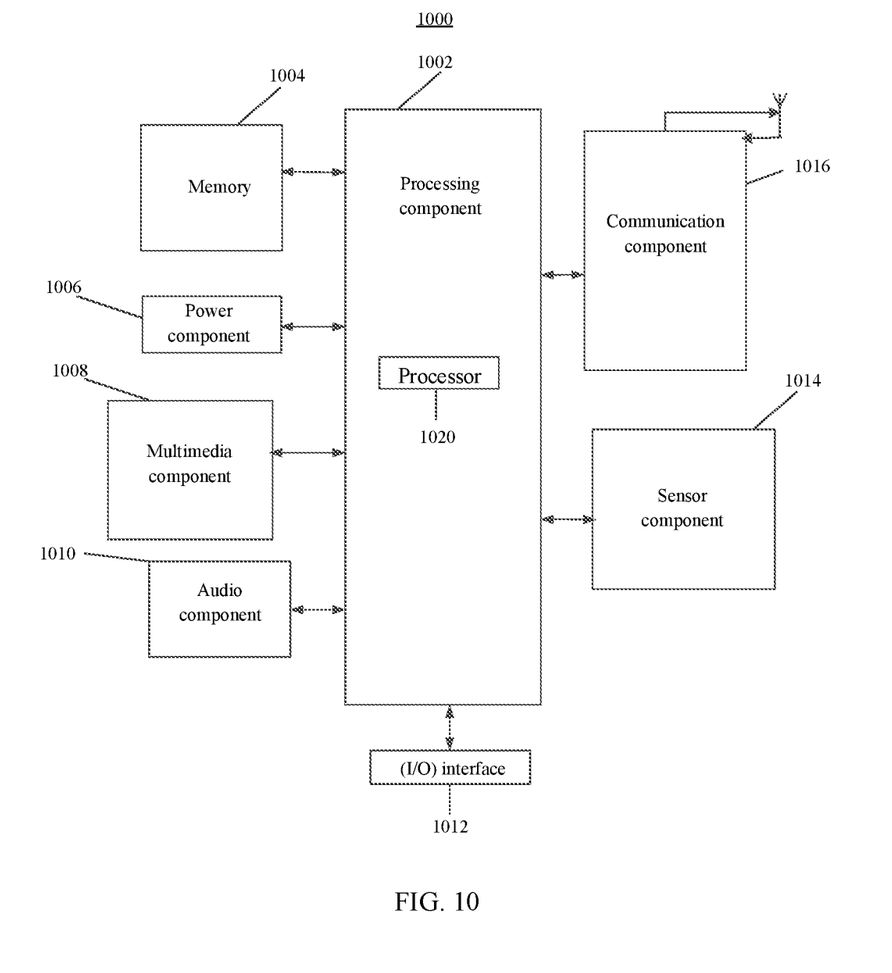
FIG. 10 is a block diagram of a terminal shown according some embodiments.

FIG. 10 is a block diagram of a terminal 1000 in accordance with some embodiments. For example, the terminal 1000 may be a mobile phone, a computer, a digital broadcast terminal, a messaging device, a gaming console, a tablet device, a medical device, a fitness equipment, a personal digital assistant, and the like.

Referring to FIG. 10, the terminal 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls the overall operations of the terminal 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The various device components, circuits, modules, units, blocks, or portions may have modular configurations, or are composed of discrete components, but nonetheless may be referred to as "modules" in general. In other words, the "components," "circuits," "modules," "units," "blocks," or "portions" referred to herein may or may not be in modular forms.

The memory 1004 is configured to store various types of data to support the operation of the terminal 1000. Examples of such data include instructions for any applications or methods operated on the terminal 1000, contact data, phonebook data, messages, pictures, videos, etc. The memory 1004 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the terminal 1000. The power component 1006 may include a power management system, one or more power sources, and any other components associated with the generation, management, and distribution of power in the terminal 1000.

The multimedia component 1008 includes a screen providing an output interface between the terminal 1000 and the user. In some embodiments, the screen may include a liquid crystal display (LCD) and a touch panel (TP). In some embodiments, organic light-emitting diode (OLED) or other types of displays can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 1008 includes a front camera and/or a rear camera. The front camera and the rear camera may receive external multimedia data while the terminal 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone (MIC) configured to receive external audio signals when the terminal 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and peripheral interface modules, such as a keyboard, a click wheel, buttons, and the like. The buttons may include, but are not limited to, a home button, a volume button, a start button, and a lock button.

The sensor component 1014 includes one or more sensors to provide status assessments of various aspects of the terminal 1000. For instance, the sensor component 1014 may detect an on/off status of the terminal 1000, relative positioning of components, e.g., the display device and the mini keyboard of the terminal 1000, and the sensor component 1014 may also detect a position change of the terminal 1000 or a component of the terminal 1000, presence or absence of user contact with the terminal 1000, orientation or acceleration/deceleration of the terminal 1000, and temperature change of the terminal 1000. The sensor component 1014 may include a proximity sensor configured to detect the presence of nearby objects without any physical contact. The sensor component 1014 may also include a light sensor, such as a CMOS or CCD image sensor, used for imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the terminal 1000 and other devices. The terminal 1000 can access a wireless network based on a communication standard, such as Wi-Fi, 2G, 3G, 4G, or 5G, or a combination thereof. In some embodiments, the communication component 1016 receives broadcast signals or broadcast associated information from an external broadcast management system via a broadcast channel. In some embodiments, the communication component 1016 further includes a near field communication (NFC) module to facilitate short-range communications.

Various embodiments of the present disclosure can have one or more of the following advantages.

By designing the resolution of the secondary display area to be equal to that of the primary display area, or the resolution of the secondary display area to be greater than that of the primary display area, and designing the light transmission performance of the secondary display area to be superior to that of the primary display area, the light transmission performance of the secondary display area is improved while a display effect of the secondary display area is ensured as much as possible. In this way, optical devices such as a camera, a light sensor, a proximity sensor, an optical transmitter and an optical receiver may be arranged below the secondary display area. In addition, these optical devices can work normally to best ensure the working performances of the optical devices.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Terms used in the present disclosure are only adopted for the purpose of describing specific embodiments but not intended to limit the present disclosure. "A/an", "said" and "the" in a singular form in the present disclosure and the appended claims are also intended to include a plural form, unless other meanings are clearly denoted throughout the present disclosure.

It is to be understood that "first", "second" and similar terms used in the specification and claims of the present application are not to represent any sequence, number or importance but only to distinguish different parts. Likewise, similar terms such as "a/an" also do not represent a number limit but represent "at least one." Terms like "include" or "contain" refer to that an element or object appearing before "include" or "contain" covers an element or object and equivalent thereof listed after "include" or "contain" and does not exclude another element or object. Similar terms such as "connect" or "interconnect" are not limited to physical or mechanical connection, and may include electrical connection, either direct or indirect.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A display screen of a terminal, comprising:
a substrate; and
a display layer over the substrate;
wherein:
the display layer comprises a primary display area and a secondary display area;
the secondary display area has a resolution greater than that of the primary display area;
a light transmission performance of the secondary display area is superior to that of the primary display area; and
the secondary display area has a pixel size less than that of the primary display area.

2. The display screen according to claim 1, wherein:
a transmittance of the secondary display area is greater than that of the primary display area; and
a light transmission quality of the secondary display area is superior to that of the primary display area.

3. The display screen according to claim 1, wherein there is at least one of:
a transmittance of the secondary display area being greater than that of the primary display area; or
a light transmission quality of the secondary display area being superior to that of the primary display area.

4. The display screen according to claim 1, wherein a center-to-center spacing between every two adjacent pixels in the secondary display area is the same as that in the primary display area.

5. The display screen according to claim 1, wherein a pixel arrangement manner of the secondary display area is the same as that of the primary display area.

6. The display screen according to claim 1, wherein a pixel structure of the secondary display area is the same as that of the primary display area.

7. The display screen according to claim 1, wherein at least one pixel is removed from the secondary display area.

8. The display screen according to claim 7, wherein the pixels removed from the secondary display area are uniformly distributed in the secondary display area.

9. The display screen according to claim 1, wherein an area between every two adjacent pixels in the secondary display area has been subjected to a light transmission performance optimization process.

10. The display screen according to claim 1, wherein a pixel control circuit of the secondary display area is below the pixel in the secondary display area.

11. The display screen according to claim 1, wherein a pixel control circuit of the secondary display area is in the primary display area.

12. The display screen according to claim 1, wherein:
the display layer further comprises a transition display area, the transition display area being between the primary display area and the secondary display area; and
a pixel control circuit of the secondary display area is in the transition display area and the primary display area.

13. The display screen according to claim 1, wherein:
the display layer further comprises a transition display area, the transition display area being between the primary display area and the secondary display area; and
a pixel control circuit of the secondary display area is in the transition display area.

14. The display screen according to claim 1, wherein:
the display layer further comprises a transition display area, the transition display area being between the primary display area and the secondary display area; and
a pixel control circuit of the secondary display area is in the primary display area.

15. The display screen according to claim 1, wherein the pixel control circuit of the secondary display area has a size smaller than that of the pixel control circuit of the primary display area.

16. The display screen according to claim 1, wherein there is at least one of:
the secondary display area in a notch portion formed in an edge at the top of the primary display area;
the secondary display area in a notch portion formed in an edge on the left side of the primary display area;
the secondary display area in a notch portion formed in an edge on the right side of the primary display area;
the secondary display area in a notch portion formed in an edge at the bottom of the primary display area; or
the secondary display area in a notch portion formed in the middle of the primary display area.

17. A terminal, comprising:
the display screen according to claim 1; and
optical devices including at least one of a camera, a light sensor, a proximity sensor, an optical transmitter, or an optical receiver disposed underneath the display screen in the secondary display area;
wherein a plurality of pixels in the secondary display area have sizes smaller than pixels in the primary display area such that a higher transmittance is higher in the secondary display area to ensure the optical devices to properly receive light transmitted through the secondary display area.

18. The terminal of claim 17, wherein the secondary display area further comprises pixels having sizes larger than or equal to sizes of the pixels in the primary display area to facilitate equal or similar display effects at the secondary display area compared with the primary display area.

19. A terminal, comprising a display screen, wherein:
the display screen comprises a substrate, and a display layer over the substrate;
the display layer comprises a primary display area and a secondary display area;
the secondary display area has a resolution greater than that of the primary display area;
the light transmission performance of the secondary display area is superior to that of the primary display area;
the secondary display area has a pixel size less than that of the primary display area; and
an optical device underneath the display screen in the secondary display area.

* * * * *